Sept. 17, 1957 A. A. CHERIN 2,807,002

DELAY SELECTION MATRICES

Filed March 12, 1954 2 Sheets-Sheet 1

INVENTOR.

ALVIN A. CHERIN,

BY

Lester S. Hecht

HIS ATTORNEY

Sept. 17, 1957 A. A. CHERIN 2,807,002

DELAY SELECTION MATRICES

Filed March 12, 1954 2 Sheets-Sheet 2

INVENTOR.
ALVIN A. CHERIN,
BY
Lester S. Hecht
HIS ATTORNEY.

United States Patent Office 2,807,002

Patented Sept. 17, 1957

2,807,002

DELAY SELECTION MATRICES

Alvin A. Cherin, Torrance, Calif., assignor to Hughes Aircraft Company, Culver City, Calif., a corporation of Delaware Application March 12, 1954, Serial No. 415,778

5 Claims. (Cl. 340—166)

Figure 1:
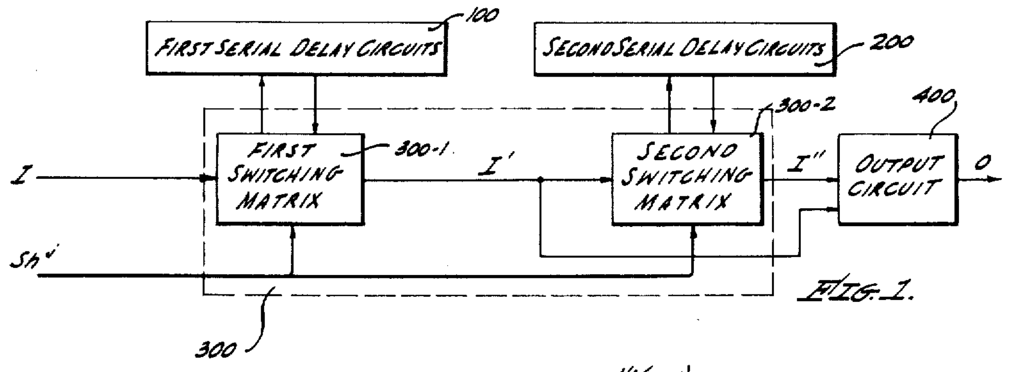

This invention relates to improvements in delay selection matrices and, more particularly, to delay selection matrices which may form a part of high-speed shifting circuits wherein first and second series of delay circuits are utilized to provide shifts of first and second orders of magnitude, respectively.

Delay selection matrices, such as are contemplated by the present invention, find utility where it is necessary to delay or shift an input signal (or signal series, as the case may be) by an amount specified by a set of delay or shift selection signals. The selection matrix is utilized to apply the input signal (or signal series) through a delay circuit having a length specified by the selection signals to an output circuit or utilization stage. In effect, the combination of selection matrix and delay circuits is a variable delay device through which any of a series of delays may be obtained in accordance with the applied set of selection signals.

In a particular application the invention may form part of a high-speed shifting circuit which is an improved version of the shifting circuit described in copending U. S. patent application Serial No. 395,212, for "Electronic Circuits for Selectively Shifting the Time Position of Digital Data," by Michael May et al., filed November 30, 1953. In its basic form the circuit described in the copending application comprises a magnetic drum circuit including a parallel writing head and a series of reading heads H$(m+1)$ . . . H$n$, positioned from the writing head along the circumference of the magnetic drum in the direction of drum rotation, so as to provide write-read delays of $(m+1)$ . . . $n$ digits, respectively. The delay of $(m+1)$ digits represents the minimum head spacing between the writing head and reading head H$(m+1)$ allowing reliable writing and reading without crosstalk or an undesirable increase in noise level. Input signals to be shifted are applied through an input circuit to the parallel writing head as well as to a plurality of series connected delay sections D1 . . . D$m$ providing delays required which are less than the minimum delay $(m+1)$ which may be provided by the drum circuit.

The delay sections D1 . . . D$m$ comprise the first series of delay circuits which are utilized to provide small shifts of 1 . . . $m$ digits; and the drum circuits including the writing head and the reading heads H$(m+1)$ . . . H$n$ form the second series of delay circuits providing shifts of higher order $m+1$ . . . $n$. In a particular form where $n$ equals 12 and $m$ equals 3, the circuit of the copending application requires nine reading heads and three delay sections. An output gating matrix is required which must provide any of 13 selections and consequently is quite complicated, results in a heavy loading of matrix switching elements, and causes the signal-to-noise ratio of the selected output signals to become undesirable.

The switching operation of the selection matrix is considerably simplified according to the present invention by separating the selection matrix into two or more matrices, where the product of the number of selections made by the separate matrices is equal to the total number of selections possible. Thus, where a first series of $m$ delay sections provide small delays and a second series of $n$ delay sections provide higher order delays; separate matrices are utilized providing selections of 0 . . . $m$ delays and 0 . . . $(m+1)$ . . . $n(m+1)$ delays, respectively. The total number of delays then availabale is equal to $(m+1).(n+1)$, where $(m+1)$ represents the number of selections available through one matrix and $(n+1)$ the number available through the other.

As is well known in the electronic switching art, the number of switching elements required in a matrix increases as a geometric series function of the number of selections to be made. Thus, four selections require only eight switching elements and 16 selections require 64 switching elements. Consequently, fewer switching elements are required to provide the switching functions for $m+1$ selections and $n+1$ selections separately than are required for $(m+1).(n+1)$ selections in a single matrix.

In addition to reducing the number of switching elements required in the selection matrix, the invention makes it possible to achieve a considerable reduction in the number of delay circuits required. Thus, in a specific situation where $m$ and $n$ are respectively equal to 1 and 6, 14 selections may be accomplished according to the present invention with only a single delay section D1 and drum reading circuits H2, H4, H6, H8, H10, and H12. In order to accomplish the 14 selections according to the technique described in the above-mentioned copending application by Michael May et al., 12 drum reading circuits H2 through H13 are required in addition to delay section D1. It will be noted that in both situations one of the 14 selections is considered to be a zero delay selection.

In its general structural form the basic embodiment of the invention comprises first and second series of delay circuits including $m$ and $n$ delay sections, respectively. The first and second delay circuit series produce delayed output signals in response to input signals after any of the series of delays 1 . . . $k$ . . . $m$ and $(m+1)$ . . . $i(m+1)$ . . . $n(m+1)$, respectively; $k$ and $i$ being integers having any of the values 1 . . . $m$ and 1 . . . $n$, respectively. Input signals are applied through the first series of delay circuits by means of a first switching matrix which is controlled by a set of selection signals S$h^j$ (which may be shift control signals) specifying the amount of delay of $k$ units, where $k$ again may represent any of the delays 1 . . . $m$ and, in addition, a zero delay. In a similar manner, input signals are applied through a delay length of $i(m+1)$ in the second series of delays by means of a second switching matrix also controlled by signal set S$h^j$ which may specify any integer value for $i$ in the series 0 . . . $i(m+1)$ . . . $n(m+1)$.

The output signals produced by one of the switching matrices are the input signals for the other switching matrix effectively providing a sum delay, so that the total delay through the selected delay sections of the first and second series of delay circuits may be any of the delays: 0 . . . $[k+i(m+1)]$ . . . $[m+n(m+1)]$. The total number of delays which may be selected then is equal to $1+m+n(m+1)=(m+1).(n+1)$ (where 0 is considered to be a delay).

In a particular circuit arrangement of the invention, input signals I are applied to a first delay section D1 in a series of delay sections D1 . . . D$k$ . . . D$m$ providing delays of 1 . . . $k$ . . . $m$ units, respectively. The signals produced by the selected delay section D$k$, in accordance with signals S$h^j$, are routed through the first switching matrix to provide input signals I' for the second switching matrix. The second matrix applies input signals I' to the writing head in a magnetic drum delay circuit and provides the selections 0, H$(m+1)$ . . . H$i(m+1)$ . . . H$n(m+1)$ producing output signals I'' delayed with respect to signals I′ by an amount $i(m+1)$. Output signals O, corresponding to signals I after any delay 0, 1 . . . $[k+i(m+1)]$ . . . $[m+n(m+1)]$ are obtained through an output circuit responsive to signals I′ and I″.

Many arrangements of the invention are possible since the delays provided by the various delay section series may be summed in any desired sequence and signals may be applied through a desired delay length either by applying the signals to the first delay section in the series and selecting the output signals, or by applying the signals to a selected one of the delay series and reading the last delay section in the series. In addition, the structure of the switching matrices varies according to the particular code selected for selection signals $Sh^j$ and the values selected for $m$ and $n$.

Accordingly, it is an object of the present invention to provide improvements in delay selection matrices which may be used in a variable delay device wherein a first series of delay circuits are utilized to provide small delays and a second series of delay circuits are utilized to provide delays of a higher order of magnitude.

Another object is to provide a delay selection matrix which may be utilized to provide the electronic switching required for selecting any of a plurality of delay circuits, the selection matrix being separated into a plurality of switching matrices in a manner defining an economical utilization of switching elements and delay circuits.

A further object is to provide a variable delay device wherein any of the delays 0 . . . $[m+n(m+1)]$ may be obtained with a minimum of switching elements and delay circuits; $m$ and $n$ respectively representing the number of first and second order delay lengths required.

Still another object is to provide a delay selection matrix wherein an economy of matrix switching elements is achieved by separating the switching function of the matrix into at least two delay selections: 0 . . . $k$ . . . $m$ and 0 . . . $i(m+1)$ . . . $n(m+1)$.

Yet a further object is to provide an improved selection matrix which may be utilized in a high-speed shifting circuit wherein small delays are obtained through a first series of delay sections D1 . . . D$k$ . . . D$m$ and higher order delays are obtained through a second series of delay circuits on a magnetic drum $H(m+1)$ . . . $Hn(m+1)$.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Figure 2A:
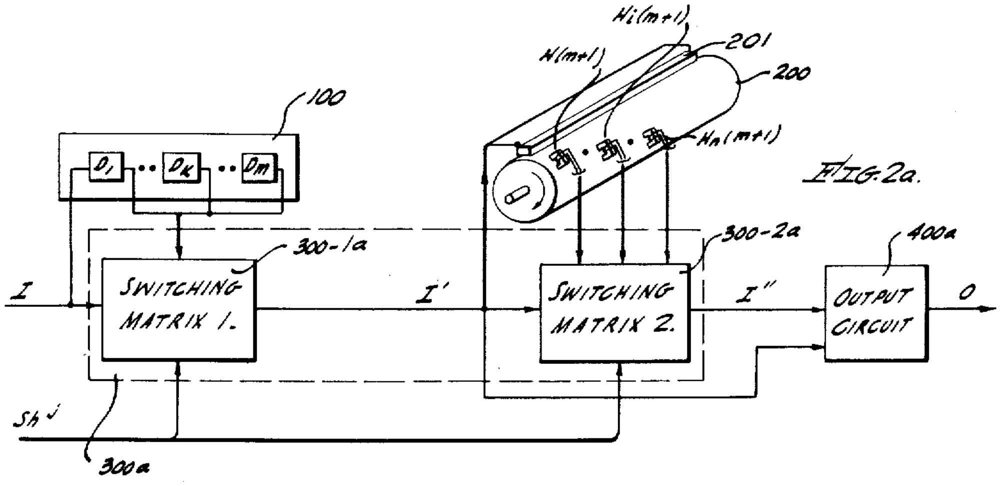
Figure 2B:
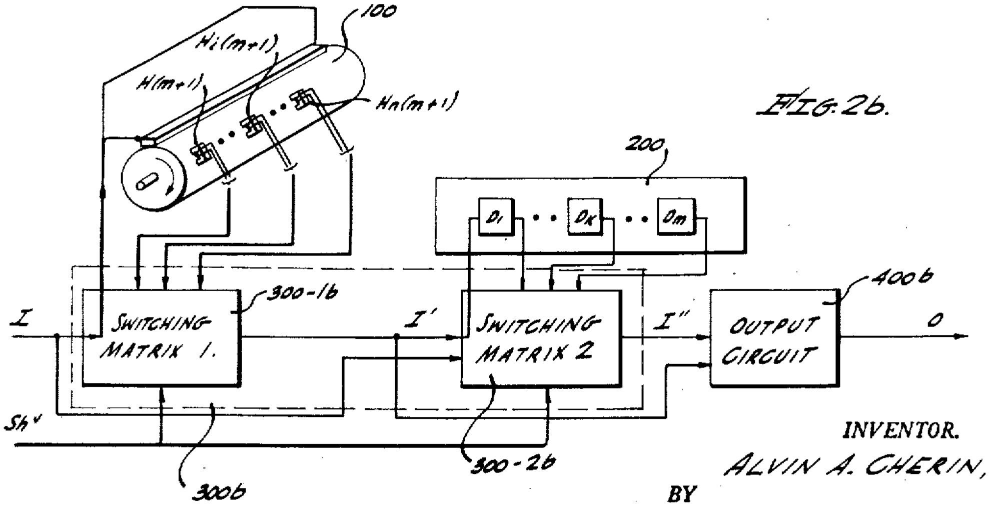
Figure 3A:
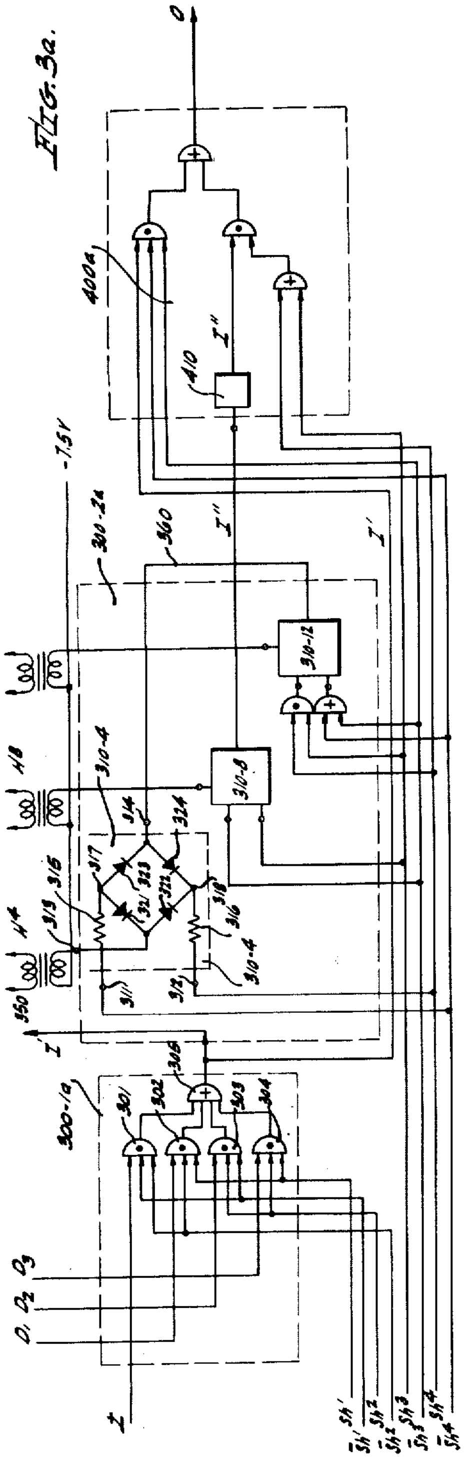
Figure 3B:
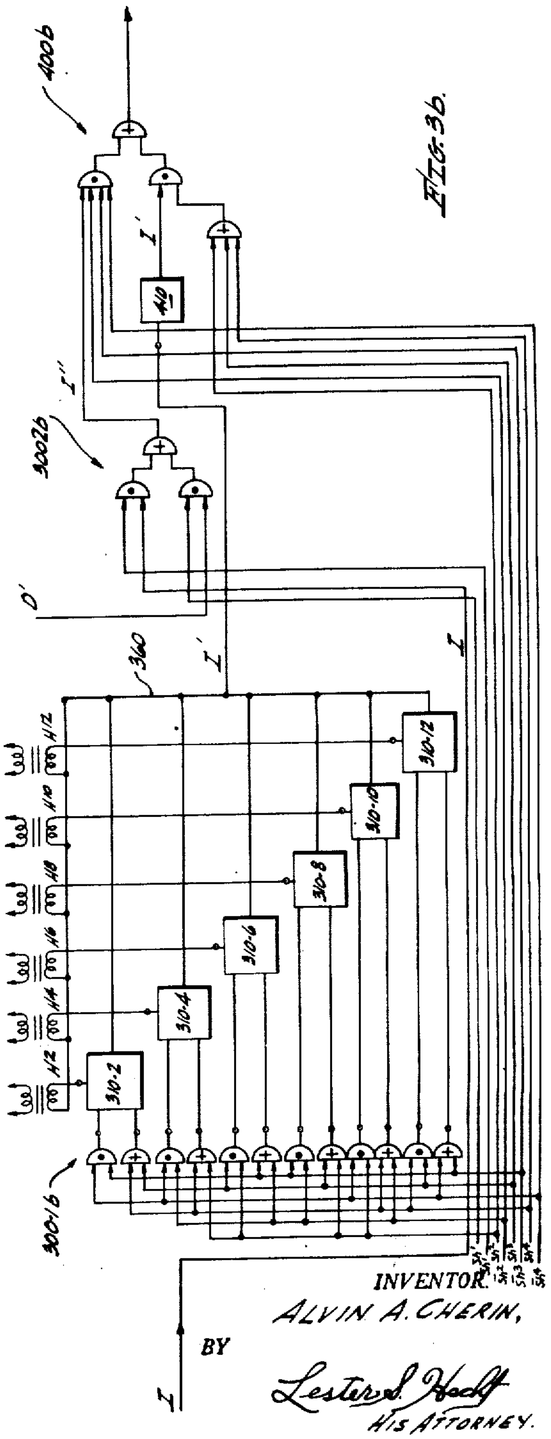

Fig. 1 is a block diagram of the basic embodiment of the invention;

Fig. 2*a* illustrates an embodiment of the invention wherein input signals I are applied to a series of delay sections D1 . . . D$m$ and output signals are derived from a series of magnetic drum delay sections $H(m+1)$ . . . $Hn(m+1)$;

Fig. 2*b* illustrates another embodiment of the invention wherein the input signals I are applied to a magnetic drum providing delays $m+1$ . . . $n(m+1)$ and output signals are derived from delay sections D1 . . . D$m$;

Fig. 3*a* illustrates suitable forms for matrices **300–1*a*, 300–2*a* and output circuit 400*a*** of Fig. 2*a*; and Fig. 3*b* illustrates suitable forms for matrices **300–1*b*, 300–2*b* and output circuit 400*b*** of Fig. 2*b*.

Reference is now made to Fig. 1 wherein there is shown a delay selection matrix 300 according to the present invention; the selection matrix being utilized in combination with a first and a second delay section comprised of a first and a second series of delay circuits 100 and 200 to constitute a variable delay device. As shown in Fig. 1 selection matrix 300 includes a first switching matrix for applying input signals I through a first delay section in delay circuits 100, the length of the first delay section being specified by a set of applied selection signals $Sh^j$. Matrix 300 also includes a second switching matrix for receiving first output signals I′ produced by matrix 300–1 and applying signals I′ through a second delay section in delay circuits 200, the second delay length being also specified by signals $Sh^j$. Matrix 300–2 produces second output signals I″ corresponding to signals I′ after any delay $i(m+1)$; signals I″ being applied to an output circuit 400 producing final output signal O after any delay $k+i(m+1)$.

The specific design of selection matrix 300 depends upon the particular selection of the code set $Sh$, the values assumed for the parameters $m$ and $n$, and the general arrangement of the delay circuits and switching matrices. In order to illustrate a few suitable mechanizations two sets of parameters $m$ and $n$ will be assumed, and two arrangements of delay circuits and switching matrices; although it will be shown that many other parameter sets and arrangements are possible. The code set $Sh^j$ will be assumed throughout to be in a conventional binary code where the number 5, for example, is coded as 0101. One arrangement of delay circuits and switching matrices is illustrated in Fig. 2*a* where the input signals I are applied to a first series of delay sections D1 . . . D$k$ . . . D$m$ and signals I′ produced by switching matrix **300–1*a* after a delay of $k$ units (0 . . . $m$) are applied by means of switching matrix 300–2*a* through a series of drum delay circuits including writing heads 201 and a series of reading heads $H(m+1)$ . . . $Hn(m+1)$ to an output circuit 400*a***.

A suitable form of selection matrix for the embodiment of Fig. 2*a* is shown in Fig. 3*a*, wherein it is assumed that both $m$ and $n$ are equal to 3 providing a total number of selections possible of $(3+1)(3+1)=16$. Delays of 0, 1, 2, or 3 are thus provided by matrix **300–1*a* forming signal I′, and any of the delays 0 through 15 are available through matrix 300–2*a* as a sum of any of the delays 0, 1, 2, or 3 and any of the delays 0, 4, 8, and 12 available through drum delay circuits 200. The switching function definition of matrices 300–1*a* and 300–2*a*** in terms of output signals I′, I″, and O may be derived from a table indicating the selected signal for each selection signal set $Sh^j$, as in Table I below:

*Table I*

| Delay units | $Sh^j$ | | | | 300–1*a* | 300–2*a* | 400*a* |
|---|---|---|---|---|---|---|---|
| | $Sh^4$ | $Sh^3$ | $Sh^2$ | $Sh^1$ | I′ | I″ | O |
| 0 | 0 | 0 | 0 | 0 | I | ------- | I′ |
| 1 | 0 | 0 | 0 | 1 | D1 | ------- | I′ |
| 2 | 0 | 0 | 1 | 0 | D2 | ------- | I′ |
| 3 | 0 | 0 | 1 | 1 | D3 | ------- | I′ |
| 4 | 0 | 1 | 0 | 0 | I | H4 | I″ |
| 5 | 0 | 1 | 0 | 1 | D1 | H4 | I″ |
| 6 | 0 | 1 | 1 | 0 | D2 | H4 | I″ |
| 7 | 0 | 1 | 1 | 1 | D3 | H4 | I″ |
| 8 | 1 | 0 | 0 | 0 | I | H8 | I″ |
| 9 | 1 | 0 | 0 | 1 | D1 | H8 | I″ |
| 10 | 1 | 0 | 1 | 0 | D2 | H8 | I″ |
| 11 | 1 | 0 | 1 | 1 | D3 | H8 | I″ |
| 12 | 1 | 1 | 0 | 0 | I | H12 | I″ |
| 13 | 1 | 1 | 0 | 1 | D1 | H12 | I″ |
| 14 | 1 | 1 | 1 | 0 | D2 | H12 | I″ |
| 15 | 1 | 1 | 1 | 1 | D3 | H12 | I″ |

As indicated in Table I the sum of the delay provided by matrices **300–1*a* and 300–2*a* is equal to the total delay required. Thus, a delay of 9 is obtained through D1 and H8 and a delay of 15 through D3 and H12**. From Table I, then, the general functional definitions of I', I'', and O may be represented as follows:

(300–1*a*)

$$I'=I.\overline{Sh^2}.\overline{Sh^1}+D^1.\overline{Sh^2}.Sh^1+D^2.Sh^2.\overline{Sh^1}+D^3.Sh^2.Sh^1$$

(300–2*a*)

$$I''=H^4.\overline{Sh^4}+H^8.\overline{Sh^3}+H^{12}.Sh^4.Sh^3$$

(400*a*)

$$O=I'.\overline{Sh^4}.\overline{Sh^3}+I''.(Sh^4+Sh^3)$$

where the dot (.) represents the logical "and," the plus (+) the logical inclusive "or," and the bar (—) over a variable represents a complement.

According to the equation defining I', signal I' corresponds to input signal I when both selection signals $Sh^2$ "and" $Sh^1$ are 0 as indicated by the condition:

$$\overline{Sh^2}.\overline{Sh^1}=1$$

"or" signal I' corresponds to signal $D^1$ (produced by delay section D1) when signal $Sh^2$ is 0 "and" signal $Sh^1$ is 1 as indicated by the condition: $\overline{Sh^2}.\overline{Sh^1}=1$; "or" signal I' corresponds to signal $D^2$ when signal condition $Sh^2.\overline{Sh^1}$ equals 1; "or" signal I' corresponds to signal $D^3$ when signal condition: $\overline{Sh^2}.Sh^1$ equals 1. The function defining 0 may be interpreted in a similar manner where I', $H^4$, $H^8$, and $H^{12}$ replace I, $D^1$, $D^2$, and $D^3$, respectively; and $Sh^4$, $\overline{Sh^4}$ and $Sh^3$, $\overline{Sh^3}$ replace $Sh^2$, $\overline{Sh^2}$ and $Sh^1$, $\overline{Sh^1}$, respectively.

It will be noted that signal I'' is not specified in Table I for delays of 0, 1, 2, and 3 since the final selection made in signal O is a function of I' only and, consequently, any value for signal I'' that is convenient may be utilized. In the equation defining I'', then, I'' is effectively defined as being equal to signal $H^4$ for the entire delay range 0 through 7 as indicated by $\overline{Sh^4}$; is equal to signal $H^8$ for the delay range 8 through 11 as indicated by $\overline{Sh^3}$; and is equal to signal $H^{12}$ in the range 12 through 15 as indicated by $Sh^4.Sh^3$.

Signals I' and I'' are then combined to form output signal O which is equal to I' in the range 0 through 3 and is equal to I'' in the range 4 through 15.

Circuits mechanized according to functions 300–1*a*, 300–2*a*, and 400*a* are illustrated in Fig. 3*a* wherein it is noted that each "and" function in the above equations is provided by an "and" circuit such as "and" circuit 301 in matrix 300–1*a* providing the function $I.\overline{Sh^2}.\overline{Sh^1}$. "And" circuit 301 is responsive to signals I, $\overline{Sh^2}$, and $\overline{Sh^1}$ applied to separate input terminals for producing a 1-representing signal representing the "and" function when all of the input signals are 1-representing signals. In a similar manner, "and" functions $D^1.\overline{Sh^2}.Sh^1$, $D^2.Sh^2.\overline{Sh^1}$, and $$D^3.Sh^2.Sh^1$$

are provided by "and" circuits 302, 303, and 304, respectively.

Each "or" function is provided by an "or" circuit which receives input signals applied to separate terminals and produces a 1-representing output signal when any one or more of the input signals are 1-representing signals. Thus, "or" circuits 305 receive signals representing the functions $I.Sh^2.Sh^1$, $D^1.Sh^2.Sh^1$, $D^2.Sh^2.Sh^1$, and $D^3.Sh^2.Sh^1$ and produces a 1-representing signal when one or more of the signals representing these functions has a 1-representing level.

A gating matrix 300–2*a* providing signal I'' as a function of magnetic drum signals $H^4$, $H^8$, and $H^{12}$ is illustrated in Fig. 3*a*, where diode bridge circuits 310 are utilized to provide the necessary switching of drum signals. The description of the gating functions of these bridge circuits is only briefly presented here since this type of gating circuit is fully described in the above-mentioned copending application by Michael May et al.

As indicated in Fig. 3*a* the gating signal and its complement are applied to first and second control terminals 311 and 312 in each corresponding diode bridge circuit. Thus, signal $\overline{Sh^4}$, utilized to gate signal $H^4$, is applied to first control terminal 311, and its complement $Sh^4$ is applied to second control terminal 312; and signal $Sh^4.Sh^3$ is applied to terminal 311 of the circuit gating signal $H^{12}$ and its complement $\overline{Sh^4}+\overline{Sh^3}$ is applied to terminal 312.

Each diode bridge includes, in addition to control terminals 311 and 312, an input terminal 313 for receiving the corresponding drum signal and an output terminal 314. The gating components of diode bridge circuit include first and second gating resistors 315 and 316 respectively coupling terminals 311 and 312 to diode bridge points 317 and 318. Bridge points 317 and 318 are respectively coupled to input terminal 313 through diodes 321 and 322 and are coupled to output terminal 314 through diodes 323 and 324. The diodes are selected to have equal impedance characteristics and are forward biased when the corresponding gating signal is a high-level signal and its complement is a low-level signal and are back biased for the reverse situation. When the diodes are forward biased the signal applied to the gating circuit is gated therethrough to the corresponding output terminal 314, otherwise no signal passes. As an illustration of suitable gating operations terminals 313 are shown as being biased at −7.5 volts through transformers 350 and the gating signals are assumed to vary between 0 volts and −15 volts. With this selection of gating and biased voltage no gating signal appears at output terminals 314. Output terminals 314 are connected to an output lead 360 which effectively combines any signal passing through the bridge circuits in an "or" function providing an output signal corresponding to I''.

The drum signal I'' is translated into an output signal suitable for utilization in circuit 400*a* through an output stage 410, which may be an amplifier flip-flop combination as in the Michael May et al. application. The output signal O, then, is produced according to function 400*a* by means of conventional "and" and "or" circuits as described.

"And" and "or" circuits are now well-known in the computer art and therefore it is not deemed necessary to consider such circuits in detail in this application. Examples of such circuits are shown on pages 37 to 45 of "High-Speed Computing Devices" by Engineering Research Associates, published in 1950 by McGraw-Hill Book Company, Inc., New York and London, and on pages 511 through 514 of an article entitled "Diode coincidence and mixing circuits in digital computers" by Tung Chang Chen, in the Proceedings of the Institute of Radio Engineers, volume 38, May 1950.

Although as an illustrative mechanization signals I'' and O have been produced separately in matrix 300–2*a* and output circuit 400*a* it is possible to combine the switching function into a single matrix directly producing output signal O. Such a matrix is defined by Equation 300–2*a'* below where the signal O is directly produced as a function of signal I' and signals $H^4$, $H^8$, and $H^{12}$.

(300–2*a'*)

$$O=I'.\overline{Sh^4}.\overline{Sh^3}+H^4.\overline{Sh^4}.Sh^3+H^8.Sh^4.\overline{Sh^3}+H^{12}.Sh^4.Sh^3$$

In addition, a simpler matrix switching function may be defined, where fewer selections are required such as delays 0 through 11 obtained through signal O defined as follows:

(300–2*a''*) $$O=I'.\overline{Sh^4}.\overline{Sh^3}+H^4.Sh^3+H^8.Sh^4$$

Another arrangement of the invention is illustrated in Fig. 2*b* wherein the magnetic drum switching functions providing the selections $i(m+1)$ are performed first through matrix 300–1*b* to form signal I', and the delay section switching functions for the selections *k* are formed in response to signal I' through matrix 300–2*b*, output signal O being then produced in circuit 400*b*. A particular mechanization suitable for matrices 300–1*b* and

**300–2*b* and output circuit 400*b*** is illustrated in Fig. 3*b* wherein it is assumed that $m=1$ and $n=6$. The equations defining these functions are derived from Table II below.

*Table II*

| Delay units | $Sh^j$ | | | | 300–1*b* | 300–2*b* | 400*b* |
|---|---|---|---|---|---|---|---|
| | $Sh^4$ | $Sh^3$ | $Sh^2$ | $Sh^1$ | I″ | I′ | O |
| 0 | 0 | 0 | 0 | 0 | I | -------- | I″ |
| 1 | 0 | 0 | 0 | 1 | D1 | -------- | I″ |
| 2 | 0 | 0 | 1 | 0 | I | H2 | I′ |
| 3 | 0 | 0 | 1 | 1 | D1 | H2 | I′ |
| 4 | 0 | 1 | 0 | 0 | I | H4 | I′ |
| 5 | 0 | 1 | 0 | 1 | D1 | H4 | I′ |
| 6 | 0 | 1 | 1 | 0 | I | H6 | I′ |
| 7 | 0 | 1 | 1 | 1 | D1 | H6 | I′ |
| 8 | 1 | 0 | 0 | 0 | I | H8 | I′ |
| 9 | 1 | 0 | 0 | 1 | D1 | H8 | I′ |
| 10 | 1 | 0 | 1 | 0 | I | H10 | I′ |
| 11 | 1 | 0 | 1 | 1 | D1 | H10 | I′ |
| 12 | 1 | 1 | 0 | 0 | I | H12 | I′ |
| 13 | 1 | 1 | 0 | 1 | D1 | H12 | I′ |

(300–2*b*) $$I''=\overline{Sh}^1.I+Sh^1.D^1$$

(300–1*b*) $$I'=\overline{Sh}^4.\overline{Sh}^3.H^2+\overline{Sh}^4.\overline{Sh}^2.H^4+Sh^3.Sh^2.H^6+\overline{Sh}^3.\overline{Sh}^2.H^8+Sh^4.Sh^2.H^{10}+Sh^4.Sh^3.H^{12}$$

(400*b*) $$O=I''.\overline{Sh}^4.\overline{Sh}^3.\overline{Sh}^2+I'.(Sh^4+Sh^3+Sh^2)$$

The mechanization of matrices **300–1*b* and 300–2*b* and output circuit 400*b*** according to these equations should be apparent from the examples already considered.

As in the previously considered examples simpler mechanizations may be obtained where fewer selections are required and matrix **300–2*b* may be defined to directly form output signal O obviating the necessity of a separate output circuit 400*b***.

From the foregoing description it is apparent that the present invention provides an improved delay selection matrix which may be utilized in variable delay devices wherein a first series of delay circuits are utilized to provide small delays and a second series of delay circuits are utilized to provide higher orders of magnitude. It should now be apparent that selection matrices according to the present invention make it possible to achieve an economy in delay circuits required as well as in the number of switching elements needed.

While the invention has been described in particularity with regard to: a particular arrangement of delay circuits and switching matrices; two specific selections for the parameters *m* and *n*; a particular binary code for signals $Sh^j$, and a few specific illustrations of mechanization functions; it will be understood that a considerable number of variations are possible without departing from the spirit of the invention.

While the invention has been described mainly in connection with a variable delay device it will be understood that the delay selection matrix defined by the invention may have other applications such as in high-speed shifting systems of the type described in the above-mentioned copending application by Michael May et al.

What is claimed as new is:

1. A delay selection matrix for applying input signals through first and second delay lengths in first and second series of delay circuits to provide delays of first and second orders of magnitude, respectively, the delay lengths being specified by a set of control signals; said delay selection matrix comprising: a first switching matrix, responsive to the control signals, for applying the input signals through at least one delay circuit of said first series to produce first output signals corresponding to the input signals after a delay of the first order of magnitude specified by the control signals; a second switching matrix responsive to the control signals for selectively applying the first output signals through at least one delay circuit of said second series to produce second output signals corresponding to said first output signals after a delay of the second order of magnitude specified by the control signals; and an output circuit, responsive to said first and second output signals, for producing third output signals corresponding to the input signals after a delay equal to the sum of the delays of the first and second orders of magnitude.

2. A delay selection matrix for applying input signals I through first and second series of delay circuits to provide any of the series of delays $1 \ldots k \ldots m$ and $(m+1) \ldots i(m+1) \ldots n(m+1)$, respectively; *k* and *i* being integers having any of the values $1 \ldots m$ and $1 \ldots n$, respectively; the total delay being specified by an applied signal set $Sh^j$ indicating any of the series of delays $0 \ldots [k+i(m+1)] \ldots [m+n(m+1)]$; said delay selection matrix comprising: first switching means for applying signals through the first series of delay circuits to produce first output signals delayed by an amount *k* specified by signals $Sh^j$; second switching means for applying signals through the second series of delay circuits to produce second output signals delayed by an amount $i(m+1)$, the integer *i* being specified by signals $Sh^j$; and output means for combining said first and second output signals to produce signals O corresponding to signals I after a total delay of $[k+i(m+1)]$ units corresponding to the sum of the delays provided by the first and second series of delay circuits.

3. A variable delay device for receiving input signals and a delay-selection signal set and for producing final output signals corresponding to the input signals selectively delayed any one of $(mn+m+n+1)$ total different delay periods as specified by the delay-selection signal sets, where *m* and *n* are each an integer; said variable delay device comprising: a first delay section consisting of *m* series-connected delay circuits, each of said *m* delay circuits being adapted to delay an input signal by a unit delay period; a second delay section consisting of *n* series-connected delay circuits, each of said *n* delay circuits being adapted to delay an input signal by $(m+1)$ delay periods; a first switching matrix coupled to one of said delay sections and responsive to the input signals and the delay-selection signal set for instantaneously impressing said input signals on said one of said delay sections for selectively applying said input signals through a selected number of the delay circuits in said one of said delay sections as indicated by said delay-selection signal sets, and for producing first output signals corresponding to the input signals delayed by a first order of magnitude; a second switching matrix coupled to said first switching matrix and the other one of said delay sections and responsive to said first output signals and said delay-selection signal set for instantaneously impressing said first output signals on said other one of said delay section for selectively applying said first output signals through a selected number of the delay circuits of said other of said delay sections as indicated by said delay-selection signal sets, and for producing second output signals corresponding to the input signals delayed by a second order of magnitude; and an output circuit coupled to said first and second switching matrices and responsive to said first and second output signals and said delay-selection signal set for instantaneously producing the desired final output signals from said first and second output signals, said final output signals corresponding to the input signals delayed by an interval of time equal to the sum of the delays of first and second orders of magnitude and delayed by a delay period selected from the $(mn+m+n+1)$ different periods by the delay-selection signal set.

4. The variable delay device defined in claim 3 wherein *m* and *n* are each equal to 3 and the total different delay periods are equal to 16, wherein the delay-selection signal set includes four pairs of complementary binary signals; wherein said first switching matrix is coupled to said first delay section and said second switching matrix is coupled to said second delay section; wherein said first switching matrix includes four logical "and" circuits and one logical "or" circuit; and wherein said second switching matrix includes three diode bridge circuits.

5. The variable delay device defined in claim 3 wherein $m$ equals 1 and $n$ equals 6 and the total different delay periods are equal to 14, wherein the delay-selection signal set includes four pairs of complementary binary signals; wherein said first switching matrix is coupled to said second delay section and said second switching matrix is coupled to said first delay section, wherein said first switching matrix includes two logical "and" circuits and one logical "or" circuit, and wherein said second switching matrix includes six diode bridge circuits.

References Cited in the file of this patent

UNITED STATES PATENTS

| | | |
|---|---|---|
| 2,543,907 | Gloess et al. | Mar. 6, 1951 |
| 2,674,732 | Robbins | Apr. 6, 1954 |

UNITED STATES PATENT OFFICE

Certificate of Correction

Patent No. 2,807,002 September 17, 1957

Alvin A. Cherin

It is hereby certified that error appears in the printed specification of the above numbered patent requiring correction and that the said Letters Patent should read as corrected below.

Column 5, line 21, for "$\overline{Sh^2}.\overline{Sh^1}=1$" read —$\overline{Sh^2}.Sh^1=1$—; line 25, for "$\overline{Sh^2}.Sh^1$" read —$Sh^2.Sh^1$—; line 63, for "$I.Sh^2.Sh^1, D^1.Sh^2.Sh^1, D^2.Sh^2.Sh^1$" read —$I.\overline{Sh^2}.\overline{Sh^1}, D^1.\overline{Sh^2}.Sh^1, D^2.Sh^2.\overline{Sh^1}$—.

Signed and sealed this 12th day of November 1957.

[SEAL]

Attest:
KARL H. AXLINE,
*Attesting Officer.*

ROBERT C. WATSON,
*Commissioner of Patents.*